US012215718B2

(12) United States Patent
Benevelli et al.

(10) Patent No.: US 12,215,718 B2
(45) Date of Patent: Feb. 4, 2025

(54) ELECTRONIC CONTROL UNIT, HYDRAULIC SYSTEM, AND METHOD FOR CONTROLLING A HYDRAULIC SYSTEM

(71) Applicant: Dana Motion Systems Italia S.R.L., Reggio Emilia (IT)

(72) Inventors: Alessandro Benevelli, Reggio Emilia (IT); Nicola Francesco Musciagna, Reggio Emilia (IT)

(73) Assignee: DANA MOTION SYSTEMS ITALIA S.R.L., Reggio Emilia (IT)

(*) Notice: Subject to any disclaimer, the term of this patent is extended or adjusted under 35 U.S.C. 154(b) by 0 days.

(21) Appl. No.: 17/823,460

(22) Filed: Aug. 30, 2022

(65) Prior Publication Data

US 2023/0060393 A1 Mar. 2, 2023

(30) Foreign Application Priority Data

Aug. 31, 2021 (DE) ..................... 10 2021 209 569.0

(51) Int. Cl.

*F15B 11/16* (2006.01)
*E02F 9/20* (2006.01)
*E02F 9/22* (2006.01)
*F15B 11/08* (2006.01)

(52) U.S. Cl.

CPC ............ *F15B 11/165* (2013.01); *E02F 9/207* (2013.01); *E02F 9/2246* (2013.01); *F15B 11/08* (2013.01); *F15B 2211/20515* (2013.01); *F15B 2211/20538* (2013.01); *F15B 2211/20546* (2013.01); *F15B 2211/253* (2013.01); *F15B 2211/605* (2013.01); *F15B 2211/6306* (2013.01); *F15B 2211/6309* (2013.01); *F15B 2211/6313* (2013.01);

(Continued)

(58) Field of Classification Search

CPC .......... F15B 11/165; F15B 2211/20515; F15B 2211/20538; F15B 2211/20546; F15B 2211/253; F15B 2211/605; F15B 2211/6306; F15B 2211/6309; F15B 2211/6313; F15B 2211/633; F15B 2211/6651; F15B 2211/6656; E02F 9/207; E02F 9/2246

See application file for complete search history.

(56) References Cited

U.S. PATENT DOCUMENTS 9,643,826 B2 * 5/2017 Kaneko .................. F02D 41/10
9,976,549 B2 * 5/2018 Mueller .................... H02P 6/10

(Continued)

FOREIGN PATENT DOCUMENTS

WO WO-2022186753 A1 * 9/2022 ................ E02F 9/22

*Primary Examiner* — Dustin T Nguyen

(74) *Attorney, Agent, or Firm* — McCoy Russell LLP

(57) ABSTRACT

The disclosure concerns an electronic control unit for a hydraulic system, the hydraulic system comprising a pump drivingly coupled to a motor, the pump configured to provide a supply pressure in a supply line of the hydraulic system. The electronic control unit is configured to receive a load sensing signal corresponding to a sensed load measure of the hydraulic system; determine, based on the load sensing signal and a predetermined pump margin, a target torque parameter for the motor; and adjust the motor based on the target torque parameter. The disclosure further concerns a hydraulic system and a method for controlling a hydraulic system.

9 Claims, 3 Drawing Sheets

(52) U.S. Cl.
CPC . *F15B 2211/633* (2013.01); *F15B 2211/6651* (2013.01); *F15B 2211/6656* (2013.01)

(56) References Cited

U.S. PATENT DOCUMENTS

| | | | | |
|---|---|---|---|---|
| 11,220,804 | B2 * | 1/2022 | Muehlbauer | F04B 49/08 |
| 2024/0151005 | A1 * | 5/2024 | Varshosaz | E02F 9/2235 |

* cited by examiner

ELECTRONIC CONTROL UNIT, HYDRAULIC SYSTEM, AND METHOD FOR CONTROLLING A HYDRAULIC SYSTEM

CROSS-REFERENCE TO RELATED APPLICATION

The present application claims priority to German Patent Application No. 10 2021 209 569.0, entitled "ELECTRONIC CONTROL UNIT, HYDRAULIC SYSTEM, AND METHOD FOR CONTROLLING A HYDRAULIC SYSTEM", and filed on Aug. 31, 2021. The entire contents of the above-listed application is hereby incorporated by reference for all purposes.

TECHNICAL FIELD

The disclosure concerns an electronic control unit (ECU) for a hydraulic system, a hydraulic system comprising such an ECU, and a method for controlling a hydraulic system. The subject matter of the disclosure may be applied in the operation of hydraulic systems, such as electrified hydraulic systems, for instance working hydraulic systems of vehicles such as off-highway vehicles.

BACKGROUND AND SUMMARY

The state of the art comprises load sensing hydraulic systems, wherein a pressure drop associated with a load is sensed as a load sensing pressure and an operational parameter of a pressure source, for instance a pump, supplying pressure to the hydraulic system is adjusted such as to maintain a predetermined load sensing pressure. Appropriate supply pressure and fluid flow at the load may thus be ensured. For instance, load sensing is commonly achieved by hydraulic load sensing means, e.g. by maintaining a constant pressure drop across a directional valve operating as a load sensing orifice and/or connected to a load sensing orifice.

Load sensing hydraulic systems commonly operate with a fixed pump margin, though systems with a variable pump margin are also known. This may be achieved, for example, by means of a variable displacement pump in conjunction with additional control valves in the system.

Known load sensing hydraulic systems, as well as associated control units and control methods, may have various drawbacks. It may be desirable to provide a load sensing hydraulic system with high system efficiency and system stability as well as a compact, simple, economic, and robust system design.

Accordingly, an object of the present disclosure is to propose an ECU for a hydraulic system, a hydraulic system, and a method for controlling a hydraulic system with some or all of the aforementioned properties.

This problem is solved by an ECU according to claim 1, a hydraulic system according to claim 3, and a method for controlling a hydraulic system according to claim 6. Special embodiments are described in the dependent claims.

Accordingly, an electronic control unit (ECU) for a hydraulic system is proposed, said hydraulic system comprising a pump drivingly coupled to a motor, the pump configured to provide a supply pressure in a supply line of the hydraulic system. The supply line may be connectable or connected to a load, for example a load of a working hydraulic system of a vehicle. The pump may be connected, for example via an inlet line and/or suction port, to a fluid reservoir.

The ECU is configured to, such as by holding code in memory for operation with a processor to, receive a load sensing signal corresponding to a sensed load measure (such as, a load measure associated with the aforementioned load) of the hydraulic system;

determine, based on the load sensing signal and a predetermined pump margin, a target torque parameter for the motor; and adjust the motor based on the target torque parameter.

The proposed ECU enables efficient and stable operation of the hydraulic system with a constant or variable pump margin. Application of the ECU may be of advantage in connection with a hydraulic system comprising a fixed-displacement pump, which may allow for a simple, economic, and robust system design (in this case, adjusting the motor as specified allows for an operation with variable pump margin even in the absence of a variable-displacement pump). However, the further advantages of the ECU may also apply to a system with a variable-displacement pump. The hydraulic system may be, for example, a working hydraulic system of a vehicle.

The sensed load measure may be a load sensing pressure, for example a hydraulic load sensing pressure (i.e. a load sensing pressure sensed by hydraulic means and/or using a dedicated load sensing hydraulic path including, e.g. a load sensing line and/or a load sensing orifice) and/or electric load sensing pressure (i.e. a load sensing pressure sensed by electric means, such as without providing a dedicated load sensing path).

The ECU may thus be used to control, with improved efficiency and/or stability, a hydraulic load sensing hydraulic system and/or an electric load sensing hydraulic system.

The pump margin may correspond to a pressure differential between the supply pressure and the load sensing pressure. The pump margin may be defined as $$P_m = P_p - P_{ls} \quad \text{(Equation 1)},$$

wherein $P_m$ is the pump margin, $P_p$ is the supply pressure, and $P_{ls}$ is the load sensing pressure.

The ECU may be configured to determine a motor torque of the motor as the target torque parameter according to the equation $$T = V_p \times \frac{P_p - P_t}{\eta_{hm}}, \quad \text{(Equation 2)}$$

wherein T is the motor torque, $V_p$ is a displacement volume of the pump, $P_t$ is a pressure at an inlet line or suction port of the pump, and $\eta_{hm}$ is a hydro-mechanical efficiency of the pump.

Using Equation 1, Equation 2 may be rewritten as $$T = V_p \times \frac{P_{ls} + P_m - P_t}{\eta_{hm}}, \quad \text{(Equation 3)}$$

and the ECU may correspondingly be configured to determine the target torque parameter according to Equation 3.

The ECU may be configured to determine the predetermined pump margin based on a fluid flow rate in the supply line, wherein a known and/or optimal relation between the predetermined pump margin and the fluid flow in the supply line may be taken into account.

A relation between the fluid flow rate Q in the supply line and the displacement volume $V_p$ is given by the equation $$Q=V_p\times\omega\times\eta_v \quad \text{(Equation 4)},$$

wherein ω is a rotational speed of the pump (equal to a rotational speed of the motor) and $\eta_v$ is a volumetric efficiency of the pump (a total efficiency $\eta_t$ of the pump is given as the product $\eta_t=\eta_{hm}\times\eta_v$).

The ECU may be configured to determine the predetermined pump margin as a variable pump margin. The ECU may be configured to determine the variable pump margin based on a variable fluid flow rate in the supply line. In this way, high efficiency and performance of the hydraulic system may be ensured.

The ECU may be configured to determine the predetermined pump margin as a maximum pump margin, for example a maximum pump margin corresponding to a maximum fluid flow in the supply line.

In this case the ECU may enable robust control of a hydraulic system without requiring a sensor to measure the supply pressure (i.e. a simple, economic, and compact system). The predetermined pump margin, in this case, corresponds to a "worst case scenario" with the maximum fluid flow in the supply line.

The ECU may comprise a feedforward controller to determine an open-loop target torque parameter, such as defined by Equation 2/3.

The ECU may comprise a closed-loop controller configured to determine a closed-loop target torque parameter based on a supply pressure signal corresponding to the supply pressure in the supply line. The ECU may comprise a closed-loop controller configured to determine a closed-loop target torque parameter based on a current speed of the motor.

Providing a closed-loop controller, for instance in addition to a feedforward controller, may further improve system performance.

A hydraulic system is further proposed, the hydraulic system comprising

- a pump configured to provide a supply pressure in a supply line of the hydraulic system;
- a motor drivingly coupled to the pump; and
- an electronic control unit (ECU) of the kind proposed here.

The pump may be a fixed-displacement pump. This may enable a simple, economic, and robust system design. However, the pump may also be a variable displacement pump. This may enable flexible operation.

The motor may be an electric motor, though other types of motors, such as a combustion engine, may also be used.

The hydraulic system may comprise a directional control valve with at least two load supply paths selectively connectable with the supply line and a pressure sensor configured to sense, as the sensed load measure, a pressure in at least one of the at least two load supply paths. Different parts of a load may be connectable or connected with each of the load supply paths. The hydraulic system may comprise a load sensing line with a load sensing orifice. The load sensing line may be connected to the fluid reservoir. However, the system may alternatively be designed without a dedicated load sensing line (such as, by providing electric load sensing means).

A method for controlling a hydraulic system is further proposed, the hydraulic system comprising a pump drivingly coupled to a motor, the pump configured to provide a supply pressure in a supply line of the hydraulic system.

The method comprises

- receiving a load sensing signal corresponding to a sensed load measure of the hydraulic system;
- determining, based on the load sensing signal and a predetermined pump margin of the pump, a target torque parameter for the motor; and
- adjusting the motor based on the target torque parameter.

The method enables control and operation of the hydraulic system with the properties and possible effects described above.

Each of the ECU, the hydraulic system, and the method, may be provided with additional features described in connection with any other one of the ECU, the hydraulic system, and the method.

The above, as well as other possible effects of the subject matter of the disclosure, will become apparent to those skilled in the art from the following detailed description of exemplary embodiments when considered in the light of the accompanying schematic drawings, in which

BRIEF DESCRIPTION OF THE FIGURES

Recurring and similar features in the drawings are provided with identical reference numerals.

DETAILED DESCRIPTION

Figure 1:
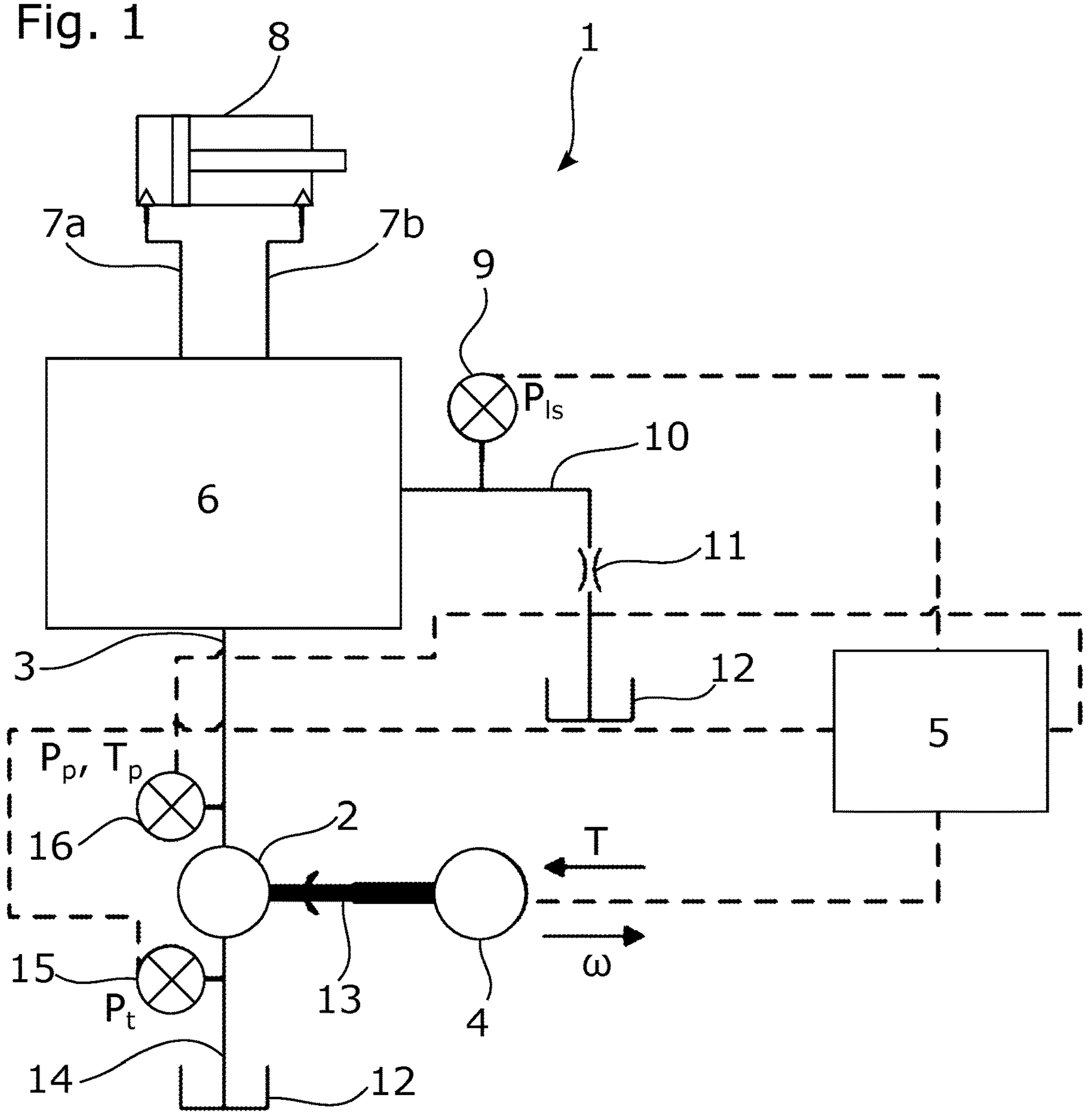
FIG. 1 shows, schematically, a hydraulic system.

The hydraulic system 1 shown in FIG. 1 comprises a pump 2 configured to provide a supply pressure in a medium (such as oil, though a different fluid may be used) in a supply line 3 of the hydraulic system 1, a motor 4 drivingly coupled to the pump 2 via a rotatable shaft 13, and an ECU 5.

The pump 2 is a fixed-displacement pump. However, a variable-displacement pump may instead be provided. The motor 4 is an electric motor, though other types of motors, such as a combustion engine, may also be used. The pump 2 comprises a suction port connected to a reservoir 12 (fluid reservoir) via a pump inlet line 14.

The hydraulic system 1 comprises a directional control valve 6 with two load supply paths connected to respective supply paths 7*a*, 7*b*, the load supply paths 7*a*, 7*b* selectively connectable with the supply line 3. The load supply paths 7*a*, 7*b* are connected to a load 8, in the illustrated example a hydraulic cylinder of a working hydraulic system of a vehicle. The hydraulic system 1 may comprise different and/or additional loads. A different number of load supply paths may be provided.

A load pressure sensor 9 is provided to sense, as a sensed load measure of the hydraulic system 1, a pressure in a load sensing line 10 connected to one of the load supply paths 7*a*, 7*b* (hydraulic load sensing pressure $P_{ls}$). The load sensing line 10 comprises a load sensing orifice 11 and is connected to reservoir 12. The illustrated example shows an exemplary design of a load sensing path, but alternative designs, such as those known in the art or described above, may be provided.

The hydraulic system 1 further comprises an inlet pressure sensor 15 configured to measure a pressure in the pump inlet line 14 (inlet pressure $P_t$) and a supply pressure sensor 16 configured to measure the supply pressure $P_p$ in the supply line 3. A temperature sensor (not shown) to sense a temperature of the medium in the supply line (supply temperature $T_p$) is also provided. In some embodiments, the inlet pressure sensor 15 and/or the supply pressure sensor 16 and/or the temperature sensor may be omitted. In some embodiments, for instance if the medium in the pump inlet line is pressurized, the inlet pressure $P_t$ may be assumed to be constant.

The ECU 5 is configured to receive a load sensing signal corresponding to the load sensing pressure sensed by load pressure sensor 9;

determine, based on the load sensing signal and a predetermined pump margin $P_m$, a target torque parameter for the motor 4; and adjust the motor 4 based on the target torque parameter.

The ECU 5 may be thus configured to carry out a method for controlling the hydraulic system 1 (or another hydraulic system such as the hydraulic system 1' described further below) comprising at least the aforementioned steps. For example, the ECU may include a processor and memory holding code for carrying out the actions described herein. In an example, the ECU receives data and/or information from sensors, such as the sensors described herein, and generates control signals and/or instructions sent to actuators for adjusting the various parameters described herein, such as the pump via the torque.

Figure 2:
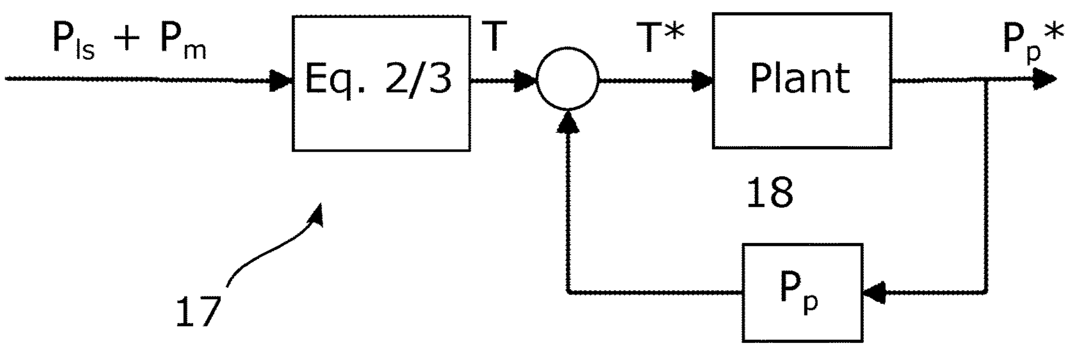
FIG. 2 shows a control scheme of an ECU for a hydraulic system such as, e.g., the hydraulic system of FIG. 1.

In the following, aspects of the operation of the ECU 5 and the hydraulic system 1 are described in further detail with reference to the control scheme shown in FIG. 2.

Figure 3:
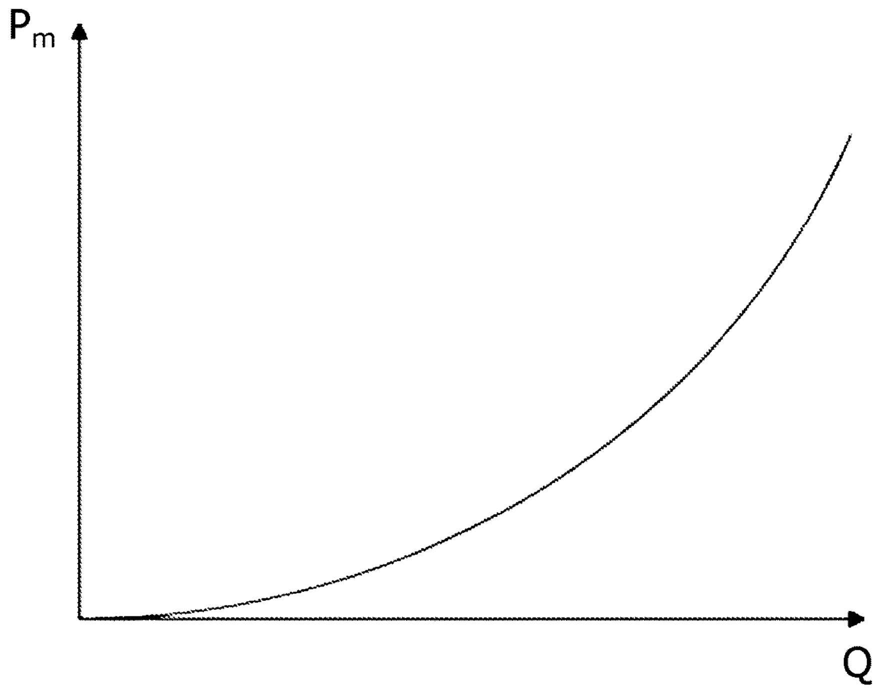
FIG. 3 shows a graph representing a relation between a pump margin and a fluid flow rate in a supply line of a hydraulic system.

The ECU 5 determines the predetermined pump margin $P_m$ as a variable pump margin based on a variable fluid flow rate Q in the supply line, wherein a pre-established relation between the predetermined pump margin Pm and the fluid flow rate Q in the supply line (as illustrated in the graph shown in FIG. 3) is taken into account. The fluid flow rate Q may be determined, for instance, using an optional flow sensor or based on Equation 4, i.e.

$$Q=V_p\times\omega\times\eta_v.$$

Here, the pump rotational speed w is equal to the known motor rotational speed, the displacement volume $V_p$ is a known property of the pump, and the volumetric efficiency $\eta_v$ (as well as the hydro-mechanical efficiency $\eta_{hm}$) of the pump is known based on a pump efficiency map, wherein the pump efficiency map specifies the pump efficiency depending on the supply pressure $P_p$, the supply temperature $T_p$, and/or the pump rotational speed ω).

Returning to FIG. 2, the ECU 5 comprises a feedforward controller block 17, which determines an open-loop target torque parameter T according to Equation 2 or 3, i. e.

$$T = V_p \times \frac{P_p - P_t}{\eta_{hm}} \text{ or } T = V_p \times \frac{P_{ls} + P_m - P_t}{\eta_{hm}}.$$

The ECU 5 further comprises a closed-loop controller block 18, which determines a closed-loop target torque parameter T* based on a supply pressure signal corresponding to the measured supply pressure $P_p$ in the supply line 3 (here, $P_p$* denotes the actual value of the supply pressure $P_p$).

Figure 4:
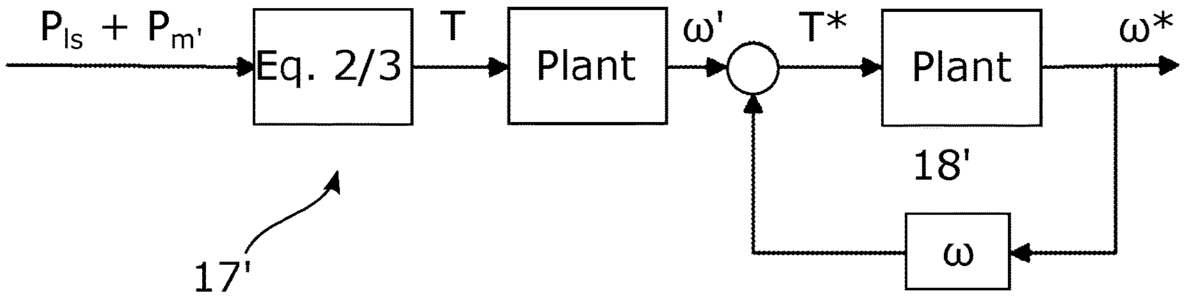
FIG. 4 shows a further example of a control scheme of an ECU for a hydraulic system.

In the following, operation of the ECU 5 according to the further example of a control scheme shown in FIG. 4 is described.

In this case, the ECU 5 determines the predetermined pump margin as a maximum pump margin $P_m$' corresponding to a maximum fluid flow in the supply line. The control scheme according to FIG. 4 may be suited for a hydraulic system wherein a supply pressure sensor is not provided.

The ECU 5 comprises a feedforward controller block 17', which determines an open-loop target torque parameter T according to Equation 2 or 3. An achieved pump rotational speed in the case of the maximum pump margin $P_m$' is denoted with ω'.

The ECU further comprises a closed-loop controller block 18', which determines a closed-loop target torque parameter T* based on based on the current rotational speed of the motor (here, ω* denotes the actual value of the pump rotational speed ω). By providing this control scheme, Pm can be intrinsically reduced up to the minimum value required to guarantee the required oil flow rate.

It is noted that various components of the different control schemes/the ECU 5 (such as the feedforward and/or closed-loop controller block) may be implemented as dedicated circuitry and/or as software running on multi-purpose digital circuitry. In FIG. 2 and FIG. 4, the term "plant" refers to the common meaning in control theory, i.e. it represents the underlying physical system, such as in terms of a system transfer function relating an input of the physical system to a corresponding output.

Figure 5:
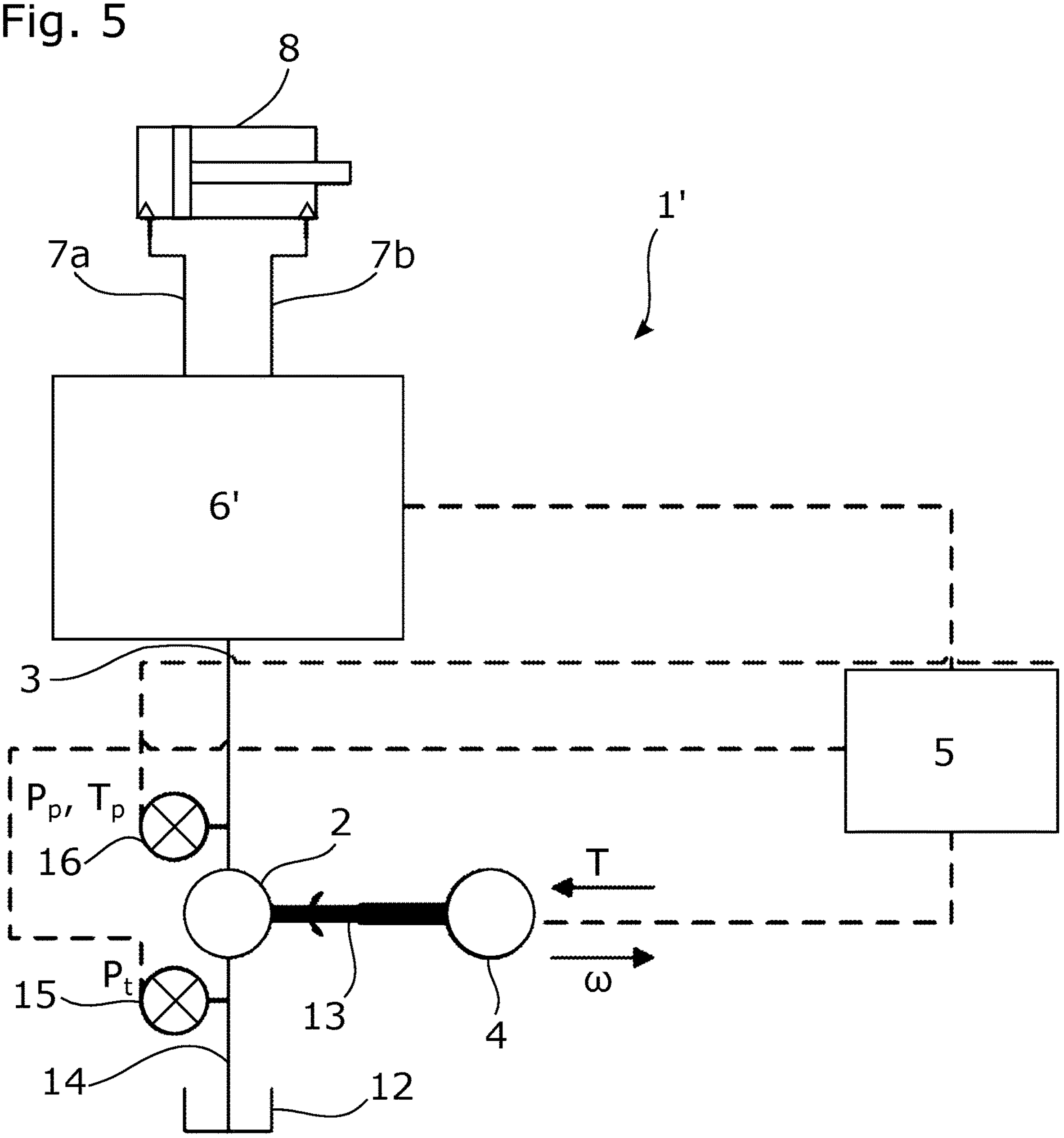
FIG. 5 shows, schematically, a further example of a hydraulic system.

As a further example of the subject matter of the present disclosure, hydraulic system 1' is shown in FIG. 5. The hydraulic system 1' is largely similar to the hydraulic system 1 described above. Accordingly, only the differences are described here.

Whereas the directional control valve 6 of hydraulic system 1 is a conventional load sensing directional control valve, the load sensing pressure being provided as a hydraulic load sensing pressure, the hydraulic system 1' comprises an electric load sensing directional control valve 6' (such as with an integrated load pressure sensor), and the load sensing pressure is provided to the ECU 5 as a load sensing signal corresponding to an electric load sensing pressure, foregoing the need for a dedicated load sensing path connected to the reservoir 12.

For instance, the hydraulic system 1' shown in FIG. 5—in contrast to hydraulic system 1 shown in FIG. 1—does not require the load sensing line 10 comprising load sensing orifice 11 and "external" load pressure sensor 9 (otherwise used to "translate" a hydraulic load sensing pressure into a load sensing signal).

The hydraulic system 1' may be operated using an ECU as described above, for instance according to any of the control scheme examples provided above.

The invention claimed is:

1. An electronic control unit for a hydraulic system, the hydraulic system comprising a pump drivingly coupled to a motor, the pump configured to provide a supply pressure in a supply line of the hydraulic system;

wherein the electronic control unit is configured to:

receive a load sensing signal corresponding to a sensed load measure of the hydraulic system, wherein the sensed load measure is a load sensing pressure;

determine, based on the load sensing pressure and a predetermined pump margin, a target torque parameter for the motor, wherein the predetermined pump margin is a pressure differential between the supply pressure and the load sensing pressure; and adjust the motor based on the target torque parameter;

wherein determining the target torque parameter comprises determining, via a closed loop controller, a closed-loop target torque parameter based on a current speed of the motor; and wherein adjusting the motor based on the target torque parameter comprises adjusting a speed of the motor based on the closed-loop target torque parameter.

2. The electronic control unit according to claim 1, further configured to determine the predetermined pump margin, as a variable pump margin, based on a variable fluid flow rate in the supply line and a pre-established relation between the predetermined pump margin and the variable fluid flow rate.

3. A hydraulic system, comprising:

a pump configured to provide a supply pressure in a supply line of the hydraulic system;

a motor drivingly coupled to the pump; and an electronic control unit according to claim 1.

4. The hydraulic system according to claim 3, wherein the pump is a fixed-displacement pump.

5. The hydraulic system according to claim 3, wherein the motor is an electric motor.

6. The hydraulic system according to claim 3, further comprising a directional control valve with at least two load supply paths selectively connectable with the supply line and a pressure sensor configured to sense, as the sensed load measure, a pressure in at least one of the at least two load supply paths.

7. A method for controlling a hydraulic system, the hydraulic system comprising a pump drivingly coupled to a motor, the pump configured to provide a supply pressure in a supply line of the hydraulic system, comprising:

receiving, by an electronic control unit, a load sensing signal corresponding to a sensed load measure of the hydraulic system, wherein the sensed load measure is a load sensing pressure;

determining, by the electronic control unit and based on the load sensing pressure and a predetermined pump margin of the pump, a target torque parameter for the motor, wherein the predetermined pump margin is a pressure differential between the supply pressure and the load sensing pressure; and adjusting, by the electronic control unit, the motor based on the target torque parameter;

wherein determining the target torque parameter comprises determining, via a closed loop controller, a closed-loop target torque parameter based on a current speed of the motor; and wherein adjusting the motor based on the target torque parameter comprises adjusting a speed of the motor based on the closed-loop target torque parameter.

8. The method of claim 7, wherein the hydraulic system is a working hydraulic system of an off-highway vehicle.

9. An electronic control unit for a hydraulic system, the hydraulic system comprising a pump drivingly coupled to a motor, the pump configured to provide a supply pressure in a supply line of the hydraulic system;

wherein the electronic control unit is configured to:

receive a load sensing signal corresponding to a sensed load measure of the hydraulic system, wherein the sensed load measure is a load sensing pressure;

determine, based on the load sensing pressure and a predetermined pump margin, a target torque parameter for the motor, wherein the predetermined pump margin is a pressure differential between the supply pressure and the load sensing pressure; and adjust the motor based on the target torque parameter; and wherein the target torque parameter is determined by the equation $$T = V_p \times \frac{P_{ls} + P_m - P_t}{\eta_{hm}},$$

wherein T is the target torque parameter, $V_p$ is a displacement volume of the pump, $P_{is}$ is a load sensing pressure, $P_m$ is the pump margin, $P_t$ is a pressure at an inlet line or suction port of the pump, and $\eta_{hm}$ is a hydro-mechanical efficiency of the pump.

* * * * *